US009019070B2

(12) United States Patent
Bhandari et al.

(10) Patent No.: US 9,019,070 B2
(45) Date of Patent: Apr. 28, 2015

(54) SYSTEMS AND METHODS FOR MANAGING ACCESS CONTROL DEVICES

(75) Inventors: Neelendra Bhandari, Barmer (IN); Sanjay Roy, Minneapolis (Plymouth), MN (US); Chandrakantha Reddy, Andhra (IN)

(73) Assignee: Honeywell International Inc., Morristown, NJ (US)

( * ) Notice: Subject to any disclaimer, the term of this patent is extended or adjusted under 35 U.S.C. 154(b) by 810 days.

(21) Appl. No.: 13/257,263

(22) PCT Filed: Mar. 12, 2010

(86) PCT No.: PCT/IB2010/051067
§ 371 (c)(1), (2), (4) Date: Nov. 21, 2011

(87) PCT Pub. No.: WO2010/106474
PCT Pub. Date: Sep. 23, 2010

(65) Prior Publication Data

US 2012/0133482 A1 May 31, 2012

(30) Foreign Application Priority Data

Mar. 19, 2009 (AU) ................................ 2009901185

(51) Int. Cl.
*G05B 19/00* (2006.01)
*G07C 9/00* (2006.01)

(52) U.S. Cl.
CPC .................................. *G07C 9/00103* (2013.01)

(58) Field of Classification Search
None
See application file for complete search history.

(56) References Cited

U.S. PATENT DOCUMENTS 3,753,232 A 8/1973 Sporer
3,806,911 A 4/1974 Pripusich
(Continued)

FOREIGN PATENT DOCUMENTS

CA 2240881 12/1999
CN 1265762 A 9/2000
(Continued)

OTHER PUBLICATIONS

U.S. Appl. No. 14/129,086, filed Dec. 23, 2013.
(Continued)

*Primary Examiner* — Curtis King
(74) *Attorney, Agent, or Firm* — Seager Tufte & Wickhem LLC

(57) ABSTRACT

Described herein are systems and methods for managing access control devices. In overview, an access control device is configured to function on the basis of an applied set of configuration data. For example, the manner in which the device processes an access request is dependent on the configuration data. A device according to an embodiment of the present invention is configured to locally maintain plurality of uniquely applicable sets of configuration data. Each set, when applied, causes the device to function in accordance with a respective mode of operation. The device is configured to change which set of configuration data is applied in response to a predetermined command, thereby allowing the device to shift between modes of operation relatively quickly and without the need to download additional configuration data. In some cases, the modes of operation correspond to threat levels, and the use of such access control devices allows a change in threat level to be applied across an access control environment quickly and with minimal bandwidth requirements.

18 Claims, 5 Drawing Sheets

(56) References Cited

U.S. PATENT DOCUMENTS 3,857,018 A 12/1974 Stark et al.
3,860,911 A 1/1975 Hinman et al.
3,866,173 A 2/1975 Moorman et al.
3,906,447 A 9/1975 Crafton
4,095,739 A 6/1978 Fox et al.
4,146,085 A 3/1979 Wills
4,148,012 A 4/1979 Baump et al.
4,161,778 A 7/1979 Getson, Jr. et al.
4,213,118 A 7/1980 Genest et al.
4,283,710 A 8/1981 Genest et al.
4,298,946 A 11/1981 Hartsell et al.
4,332,852 A 6/1982 Korklan et al.
4,336,902 A 6/1982 Neal
4,337,893 A 7/1982 Flanders et al.
4,353,064 A 10/1982 Stamm
4,373,664 A 2/1983 Barker et al.
4,379,483 A 4/1983 Farley
4,462,028 A 7/1984 Ryan et al.
4,525,777 A 6/1985 Webster et al.
4,538,056 A 8/1985 Young et al.
4,556,169 A 12/1985 Zervos
4,628,201 A 12/1986 Schmitt
4,646,964 A 3/1987 Parker et al.
4,685,615 A 8/1987 Hart
4,821,177 A 4/1989 Koegel et al.
4,847,839 A 7/1989 Hudson, Jr. et al.
5,070,468 A 12/1991 Niinomi et al.
5,071,065 A 12/1991 Aalto et al.
5,099,420 A 3/1992 Barlow et al.
5,172,565 A 12/1992 Wruck et al.
5,204,663 A 4/1993 Lee
5,227,122 A 7/1993 Scarola et al.
5,259,553 A 11/1993 Shyu
5,271,453 A 12/1993 Yoshida et al.
5,361,982 A 11/1994 Liebl et al.
5,404,934 A 4/1995 Carlson et al.
5,420,927 A 5/1995 Micali
5,449,112 A 9/1995 Heitman et al.
5,465,082 A 11/1995 Chaco
5,479,154 A 12/1995 Wolfram
5,481,481 A 1/1996 Frey et al.
5,526,871 A 6/1996 Musser et al.
5,541,585 A 7/1996 Duhame et al.
5,591,950 A 1/1997 Imedio-Ocana
5,594,429 A 1/1997 Nakahara
5,604,804 A 2/1997 Micali
5,610,982 A 3/1997 Micali
5,631,825 A 5/1997 van Weele et al.
5,640,151 A 6/1997 Reis et al.
5,644,302 A 7/1997 Hana et al.
5,663,957 A 9/1997 Dent
5,666,416 A 9/1997 Micali
5,717,757 A 2/1998 Micali
5,717,758 A 2/1998 Micali
5,717,759 A 2/1998 Micali
5,732,691 A 3/1998 Maiello et al.
5,774,058 A 6/1998 Henry et al.
5,778,256 A 7/1998 Darbee
5,793,868 A 8/1998 Micali
5,914,875 A 6/1999 Monta et al.
5,915,473 A 6/1999 Ganesh et al.
5,923,817 A 7/1999 Nakamura
5,927,398 A 7/1999 Maciulewicz
5,930,773 A 7/1999 Crooks et al.
5,960,083 A 9/1999 Micali
5,973,613 A 10/1999 Reis et al.
5,992,194 A 11/1999 Baukholt et al.
6,072,402 A 6/2000 Kniffin et al.
6,097,811 A 8/2000 Micali
6,104,963 A 8/2000 Cebasek et al.
6,119,125 A 9/2000 Gloudeman et al.
6,141,595 A 10/2000 Gloudeman et al.
6,149,065 A 11/2000 White et al.
6,154,681 A 11/2000 Drees et al.
6,167,316 A 12/2000 Gloudeman et al.
6,233,954 B1 5/2001 Mehaffey et al.
6,241,156 B1 6/2001 Kline et al.
6,249,755 B1 6/2001 Yemini et al.
6,260,765 B1 7/2001 Natale et al.
6,268,797 B1 7/2001 Berube et al.
6,292,893 B1 9/2001 Micali
6,301,659 B1 10/2001 Micali
6,318,137 B1 11/2001 Chaum
6,324,854 B1 12/2001 Jayanth
6,334,121 B1 12/2001 Primeaux et al.
6,347,374 B1 2/2002 Drake et al.
6,366,558 B1 4/2002 Howes et al.
6,369,719 B1 4/2002 Tracy et al.
6,374,356 B1 4/2002 Daigneault et al.
6,393,848 B2 5/2002 Roh et al.
6,394,359 B1 5/2002 Morgan
6,424,068 B2 7/2002 Nakagashi
6,453,426 B1 9/2002 Gamache et al.
6,453,687 B2 9/2002 Sharood et al.
6,483,697 B1 11/2002 Jenks et al.
6,487,658 B1 11/2002 Micali
6,490,610 B1 12/2002 Rizvi et al.
6,496,575 B1 12/2002 Vasell et al.
6,516,357 B1 2/2003 Hamann et al.
6,518,953 B1 2/2003 Armstrong
6,546,419 B1 4/2003 Humpleman et al.
6,556,899 B1 4/2003 Harvey et al.
6,574,537 B2 6/2003 Kipersztok et al.
6,583,712 B1 6/2003 Reed et al.
6,604,023 B1 8/2003 Brown et al.
6,615,594 B2 9/2003 Jayanth et al.
6,628,997 B1 9/2003 Fox et al.
6,647,317 B2 11/2003 Takai et al.
6,647,400 B1 11/2003 Moran
6,658,373 B2 12/2003 Rossi et al.
6,663,010 B2 12/2003 Chene et al.
6,665,669 B2 12/2003 Han et al.
6,667,690 B2 12/2003 Durej et al.
6,741,915 B2 5/2004 Poth
6,758,051 B2 7/2004 Jayanth et al.
6,766,450 B2 7/2004 Micali
6,789,739 B2 9/2004 Rosen
6,796,494 B1 9/2004 Gonzalo
6,801,849 B2 10/2004 Szukala et al.
6,801,907 B1 10/2004 Zagami
6,826,454 B2 11/2004 Sulfstede
6,829,332 B2 12/2004 Farris et al.
6,851,621 B1 2/2005 Wacker et al.
6,871,193 B1 3/2005 Campbell et al.
6,886,742 B2 5/2005 Stoutenburg et al.
6,895,215 B2 5/2005 Uhlmann
6,910,135 B1 6/2005 Grainger
6,967,612 B1 11/2005 Gorman et al.
6,969,542 B2 11/2005 Klasen-Memmer et al.
6,970,070 B2 11/2005 Juels et al.
6,973,410 B2 12/2005 Seigel
6,983,889 B2 1/2006 Alles
6,989,742 B2 1/2006 Ueno et al.
7,004,401 B2 2/2006 Kallestad
7,019,614 B2 3/2006 Lavelle et al.
7,032,114 B1 4/2006 Moran
7,055,759 B2 6/2006 Wacker et al.
7,076,083 B2 7/2006 Blazey
7,117,356 B2 10/2006 LaCous
7,124,943 B2 10/2006 Quan et al.
7,130,719 B2 10/2006 Ehlers et al.
7,183,894 B2 2/2007 Yui et al.
7,203,962 B1 4/2007 Moran
7,205,882 B2 4/2007 Libin
7,216,007 B2 5/2007 Johnson
7,216,015 B2 5/2007 Poth
7,218,243 B2 5/2007 Hayes et al.
7,222,800 B2 5/2007 Wruck
7,233,243 B2 6/2007 Roche et al.
7,243,001 B2 7/2007 Janert et al.
7,245,223 B2 7/2007 Trela
7,250,853 B2 7/2007 Flynn
7,274,676 B2 9/2007 Cardei et al.
7,280,030 B1 * 10/2007 Monaco ....................... 340/5.21

(56) References Cited

U.S. PATENT DOCUMENTS

| | | | | |
|---|---|---|---|---|
| 7,283,489 | B2 | 10/2007 | Palaez et al. | |
| 7,313,819 | B2 | 12/2007 | Burnett et al. | |
| 7,321,784 | B2 | 1/2008 | Serceki et al. | |
| 7,337,315 | B2 | 2/2008 | Micali | |
| 7,340,743 | B1 * | 3/2008 | Anural et al. | 718/104 |
| 7,343,265 | B2 | 3/2008 | Andarawis et al. | |
| 7,353,396 | B2 | 4/2008 | Micali et al. | |
| 7,362,210 | B2 | 4/2008 | Bazakos et al. | |
| 7,376,839 | B2 | 5/2008 | Carta et al. | |
| 7,379,997 | B2 | 5/2008 | Ehlers et al. | |
| 7,380,125 | B2 | 5/2008 | Di Luoffo et al. | |
| 7,383,158 | B2 | 6/2008 | Krocker et al. | |
| 7,397,371 | B2 | 7/2008 | Martin et al. | |
| 7,408,925 | B1 | 8/2008 | Boyle et al. | |
| 7,487,538 | B2 | 2/2009 | Mok | |
| 7,505,914 | B2 | 3/2009 | McCall | |
| 7,542,867 | B2 | 6/2009 | Steger et al. | |
| 7,543,327 | B1 | 6/2009 | Kaplinsky | |
| 7,574,734 | B2 | 8/2009 | Fedronic et al. | |
| 7,576,770 | B2 | 8/2009 | Metzger et al. | |
| 7,583,401 | B2 | 9/2009 | Lewis | |
| 7,586,398 | B2 | 9/2009 | Huang et al. | |
| 7,600,679 | B2 | 10/2009 | Kshirsagar et al. | |
| 7,634,662 | B2 | 12/2009 | Monroe | |
| 7,661,603 | B2 | 2/2010 | Yoon et al. | |
| 7,683,940 | B2 | 3/2010 | Fleming | |
| 7,735,132 | B2 | 6/2010 | Brown et al. | |
| 7,735,145 | B2 | 6/2010 | Kuehnel et al. | |
| 7,796,536 | B2 | 9/2010 | Roy et al. | |
| 7,801,870 | B2 | 9/2010 | Oh et al. | |
| 7,818,026 | B2 | 10/2010 | Hartikainen et al. | |
| 7,839,926 | B1 | 11/2010 | Metzger et al. | |
| 7,853,987 | B2 | 12/2010 | Balasubramanian et al. | |
| 7,861,314 | B2 | 12/2010 | Serani et al. | |
| 7,873,441 | B2 | 1/2011 | Synesiou et al. | |
| 7,907,753 | B2 | 3/2011 | Wilson et al. | |
| 7,937,669 | B2 | 5/2011 | Zhang et al. | |
| 7,983,892 | B2 | 7/2011 | Anne et al. | |
| 7,995,526 | B2 | 8/2011 | Liu et al. | |
| 7,999,847 | B2 | 8/2011 | Donovan et al. | |
| 8,045,960 | B2 | 10/2011 | Orakkan | |
| 8,069,144 | B2 | 11/2011 | Quinlan et al. | |
| 8,089,341 | B2 | 1/2012 | Nakagawa et al. | |
| 8,095,889 | B2 | 1/2012 | DeBlaey et al. | |
| 8,199,196 | B2 | 6/2012 | Klein et al. | |
| 8,316,407 | B2 | 11/2012 | Lee et al. | |
| 8,474,029 | B2 | 6/2013 | Adams et al. | |
| 8,509,987 | B2 | 8/2013 | Resner | |
| 8,543,684 | B2 * | 9/2013 | Hulusi et al. | 709/224 |
| 8,560,970 | B2 | 10/2013 | Liddington | |
| 8,605,151 | B2 | 12/2013 | Bellamy et al. | |
| 2002/0011923 | A1 | 1/2002 | Cunningham et al. | |
| 2002/0022991 | A1 | 2/2002 | Sharood et al. | |
| 2002/0046337 | A1 | 4/2002 | Micali | |
| 2002/0118096 | A1 | 8/2002 | Hoyos et al. | |
| 2002/0121961 | A1 | 9/2002 | Huff | |
| 2002/0165824 | A1 | 11/2002 | Micali | |
| 2002/0170064 | A1 | 11/2002 | Monroe et al. | |
| 2003/0023866 | A1 * | 1/2003 | Hinchliffe et al. | 713/200 |
| 2003/0033230 | A1 | 2/2003 | McCall | |
| 2003/0071714 | A1 | 4/2003 | Bayer et al. | |
| 2003/0174049 | A1 | 9/2003 | Beigel et al. | |
| 2003/0208689 | A1 | 11/2003 | Garza | |
| 2003/0233432 | A1 | 12/2003 | Davis et al. | |
| 2004/0062421 | A1 | 4/2004 | Jakubowski et al. | |
| 2004/0064453 | A1 | 4/2004 | Ruiz et al. | |
| 2004/0068583 | A1 | 4/2004 | Monroe et al. | |
| 2004/0087362 | A1 | 5/2004 | Beavers | |
| 2004/0205350 | A1 | 10/2004 | Waterhouse et al. | |
| 2005/0138380 | A1 | 6/2005 | Fedronic et al. | |
| 2005/0200714 | A1 | 9/2005 | Marchese | |
| 2006/0017939 | A1 | 1/2006 | Jamieson et al. | |
| 2006/0059557 | A1 | 3/2006 | Markham et al. | |
| 2007/0109098 | A1 | 5/2007 | Siemon et al. | |
| 2007/0132550 | A1 | 6/2007 | Avraham et al. | |
| 2007/0171862 | A1 | 7/2007 | Tang et al. | |
| 2007/0268145 | A1 | 11/2007 | Bazakos et al. | |
| 2007/0272744 | A1 | 11/2007 | Bantwal et al. | |
| 2008/0086758 | A1 | 4/2008 | Chowdhury et al. | |
| 2008/0173709 | A1 | 7/2008 | Ghosh | |
| 2008/0272881 | A1 | 11/2008 | Goel | |
| 2009/0018900 | A1 | 1/2009 | Waldron et al. | |
| 2009/0080443 | A1 | 3/2009 | Dziadosz | |
| 2009/0086692 | A1 | 4/2009 | Chen | |
| 2009/0097815 | A1 | 4/2009 | Lahr et al. | |
| 2009/0121830 | A1 | 5/2009 | Dziadosz | |
| 2009/0167485 | A1 | 7/2009 | Birchbauer et al. | |
| 2009/0168695 | A1 | 7/2009 | Johar et al. | |
| 2009/0258643 | A1 | 10/2009 | McGuffin | |
| 2009/0266885 | A1 | 10/2009 | Marcinowski et al. | |
| 2009/0292524 | A1 | 11/2009 | Anne et al. | |
| 2009/0292995 | A1 | 11/2009 | Anne et al. | |
| 2009/0292996 | A1 | 11/2009 | Anne et al. | |
| 2009/0328152 | A1 | 12/2009 | Thomas et al. | |
| 2009/0328203 | A1 | 12/2009 | Haas | |
| 2010/0026811 | A1 | 2/2010 | Palmer | |
| 2010/0036511 | A1 | 2/2010 | Dongare | |
| 2010/0045424 | A1 * | 2/2010 | Kawakita | 340/5.2 |
| 2010/0148918 | A1 | 6/2010 | Gerner et al. | |
| 2010/0164720 | A1 | 7/2010 | Kore | |
| 2010/0220715 | A1 | 9/2010 | Cherchali et al. | |
| 2010/0269173 | A1 | 10/2010 | Srinvasa et al. | |
| 2011/0038278 | A1 | 2/2011 | Bhandari et al. | |
| 2011/0043631 | A1 | 2/2011 | Marman et al. | |
| 2011/0071929 | A1 | 3/2011 | Morrison | |
| 2011/0115602 | A1 | 5/2011 | Bhandari et al. | |
| 2011/0133884 | A1 | 6/2011 | Kumar et al. | |
| 2011/0153791 | A1 | 6/2011 | Jones et al. | |
| 2011/0167488 | A1 | 7/2011 | Roy et al. | |
| 2011/0181414 | A1 | 7/2011 | G et al. | |
| 2012/0096131 | A1 | 4/2012 | Bhandari et al. | |
| 2012/0106915 | A1 | 5/2012 | Palmer | |
| 2012/0121229 | A1 | 5/2012 | Lee | |
| 2012/0133482 | A1 | 5/2012 | Bhandari et al. | |

FOREIGN PATENT DOCUMENTS

| | | | |
|---|---|---|---|
| DE | 19945861 | | 3/2001 |
| EP | 0043270 | | 1/1982 |
| EP | 0122244 | | 10/1984 |
| EP | 0152678 | | 8/1985 |
| EP | 0629940 | | 12/1994 |
| EP | 0858702 | | 4/2002 |
| EP | 1339028 | | 8/2003 |
| EP | 1630639 | | 3/2006 |
| GB | 2251266 | | 7/1992 |
| GB | 2390705 | | 1/2004 |
| JP | 6019911 | | 1/1994 |
| JP | 2003/074942 | | 3/2003 |
| JP | 2003/240318 | | 8/2003 |
| WO | WO 84/02786 | | 7/1984 |
| WO | WO 94/19912 | | 9/1994 |
| WO | WO 96/27858 | | 9/1996 |
| WO | WO 00/11592 | | 3/2000 |
| WO | 0076220 | A1 | 12/2000 |
| WO | WO 01/42598 | | 6/2001 |
| WO | WO 01/57489 | | 8/2001 |
| WO | WO 01/60024 | | 8/2001 |
| WO | WO 02/32045 | | 4/2002 |
| WO | WO 02/091311 | | 11/2002 |
| WO | WO 03/090000 | | 10/2003 |
| WO | WO 2004/092514 | | 10/2004 |
| WO | WO 2005/038727 | | 4/2005 |
| WO | WO 2006/021047 | | 3/2006 |
| WO | WO 2006/049181 | | 5/2006 |
| WO | 2006126974 | A1 | 11/2006 |
| WO | 2007043798 | A1 | 4/2007 |
| WO | WO 2008/045918 | | 4/2008 |
| WO | WO 2008/144803 | | 12/2008 |
| WO | 2010039598 | A2 | 4/2010 |

(56) References Cited

FOREIGN PATENT DOCUMENTS

| | | | |
|---|---|---|---|
| WO | WO 2010/039598 | | 4/2010 |
| WO | 2010106474 | A1 | 9/2010 |

OTHER PUBLICATIONS

"Keyfast Technical Overview", Corestreet Ltd., 21 pages, 2004.
U.S. Appl. No. 13/533,334, filed Jun. 26, 2012.
"Certificate Validation Choices," CoreStreet, Inc., 8 pages, 2002.
"CoreStreet Cuts the PKI Gordian Knot," Digital ID World, pp. 22-25, Jun./Jul. 2004.
"Distributed Certificate Validation," CoreStreet, Ltd., 17 pages, 2006.
"Identity Services Infrastructure," CoreStreet Solutions—Whitepaper, 12 pages, 2006.
"Important FIPS 201 Deployment Considerations," Corestreet Ltd.—Whitepaper, 11 pages, 2005.
"Introduction to Validation for Federated PKI," Corestreet Ltd, 20 pages, 2006.
"Manageable Secure Physical Access," Corestreet Ltd, 3 pages, 2002.
"MiniCRL, Corestreet Technology Datasheet," CoreStreet, 1 page, 2006.
"Nonce Sense, Freshness and Security in OCSP Responses," Corestreet Ltd, 2 pages, 2003.
"Real Time Credential Validation, Secure, Efficient Permissions Management," Corestreet Ltd, 5 pages, 2002.
"The Role of Practical Validation for Homeland Security," Corestreet Ltd, 3 pages, 2002.
"The Roles of Authentication, Authorization & Cryptography in Expanding Security Industry Technology," Security Industry Association (SIA), Quarterly Technical Update, 32 pages, Dec. 2005.
"Vulnerability Analysis of Certificate Validation Systems," Corestreet Ltd—Whitepaper, 14 pages, 2006.
U.S. Appl. No. 13/292,992, filed Nov. 9, 2011.
Goldman et al., "Information Modeling for Intrusion Report Aggregation," IEEE, Proceedings DARPA Information Survivability Conference and Exposition II, pp. 329-342, 2001.
Honeywell, "Excel Building Supervisor-Integrated R7044 and FS90 Ver. 2.0," Operator Manual, 70 pages, Apr. 1995.
http://www.tcsbasys.com/products/superstats.asp, TCS/Basys Controls: Where Buildings Connect With Business, 2 pages, printed Aug. 26, 2003.
http://www.tcsbasys.com/products/sz1009.asp, TCS/Basys Controls: Where Buildings Connect With Business, 1 page, printed Aug. 26, 2003.
http://www.tcsbasys.com/products/sz1017a.asp, TCS/Basys Controls: Where Buildings Connect With Business, 1 page, printed Aug. 26, 2003.
http://www.tcsbasys.com/products/sz1017n.asp, TCS/Basys Controls: Where Buildings Connect With Business, 1 page, printed Aug. 26, 2003.
http://www.tcsbasys.com/products/sz1020nseries.asp, TCS/Basys Controls: Where Buildings Connect With Business, 2 pages, printed Aug. 26, 2003.
http://www.tcsbasys.com/products/sz1020series.asp, TCS/Basys Controls: Where Buildings Connect With Business, 2 pages, printed Aug. 26, 2003.
http://www.tcsbasys.com/products/sz1022.asp, TCS/Basys Controls: Where Buildings Connect With Business, 2 pages, printed Aug. 26, 2003.
http://www.tcsbasys.com/products/sz1024.asp, TCS/Basys Controls: Where Buildings Connect With Business, 2 pages, printed Aug. 26, 2003.
http://www.tcsbasys.com/products/sz1030series.asp, TCS/Basys Controls: Where Buildings Connect With Business, 2 pages, printed Aug. 26, 2003.
http://www.tcsbasys.com/products/sz1033.asp, TCS/Basys Controls: Where Buildings Connect With Business, 2 pages, printed Aug. 26, 2003.
http://www.tcsbasys.com/products/sz1035.asp, TCS/Basys Controls: Where Buildings Connect With Business, 2 pages, printed Aug. 26, 2003.
http://www.tcsbasys.com/products/sz1041.asp, TCS/Basys Controls: Where Buildings Connect With Business, 1 page, printed Aug. 26, 2003.
http://www.tcsbasys.com/products/sz1050series.asp, TCS/Basys Controls: Where Buildings Connect With Business, 2 pages, printed Aug. 26, 2003.
http://www.tcsbasys.com/products/sz1051.asp, TCS/Basys Controls: Where Buildings Connect With Business, 2 pages, printed Aug. 26, 2003.
http://www.tcsbasys.com/products/sz1053.asp, TCS/Basys Controls: Where Buildings Connect With Business, 2 pages, printed Aug. 26, 2003.
http://wwww.tcsbasys.com/products/sz1031.asp, TCS/Basys Controls: Where Buildings Connect With Business, 2 pages, printed Aug. 26, 2003.
Trane, "System Programming, Tracer Summit Version 14, BMTW-SVP01D-EN," 623 pages, 2002.

* cited by examiner

SYSTEMS AND METHODS FOR MANAGING ACCESS CONTROL DEVICES

FIELD OF THE INVENTION

The present invention relates to access control, and more particularly to systems and methods for managing access control devices. In particular, some embodiments include access control devices themselves, and/or software operable on access control devices or other devices.

Embodiments of the invention have been particularly developed for allowing the efficient implementation of a threat level across an access control environment. Although the invention is described hereinafter with particular reference to such applications, it will be appreciated that the invention is applicable in broader contexts.

BACKGROUND

Any discussion of the prior art throughout the specification should in no way be considered as an admission that such prior art is widely known or forms part of common general knowledge in the field.

It is known to use a large number of access control devices in an access control environment. Before each individual access control device is able to function as part of the access control environment, those individual devices need to be commissioned and configured. Commissioning refers to a process whereby the devices are initialized to operate within a common access control environment. Configuration refers to a process whereby configuration data is downloaded to the individual devices, thereby to allow those devices to function appropriately. For example, configuration data affects how a device will respond to an access request from a user.

From time-to-time, there may be a desire to modify configuration data on some or all of the access control devices within an access control environment and, in this regard, there are various known approaches for transferring new configuration data to those devices. For example, it is often possible to transfer such configuration data from a central server to the individual devices via a network, such as a TCP/IP network. Other approaches include the use of portable computers and the like.

Transferring configuration data can be a time and resource intensive task, and this can lead to complications in situations where there is a desire to make a change across an entire access control environment on an expeditious basis.

It follows that there is a need in the art for improved systems and methods for managing access control devices.

SUMMARY

It is an object of the present invention to overcome or ameliorate at least one of the disadvantages of the prior art, or to provide a useful alternative.

One embodiment provides an access control device including: a processor for allowing the execution of software instructions, including software instructions for processing data indicative of access requests on the basis of an applied set of configuration data and selectively allowing or denying the respective requests; a memory module coupled to the processor, the memory module storing data indicative of the software instructions and configuration data, wherein the configuration data stored by the device includes a plurality of uniquely applicable sets of configuration data, wherein each set, when applied, causes the device to function in accordance with a respective mode of operation; and a communications interface that is configured for receiving data indicative of a command to change modes of operation, wherein in response to the command the software instructions cause the device to cease applying a current set of configuration data and commence applying a different set of configuration data identified by the command.

One embodiment provides a method performable by an access control device, the method including: applying a first set of configuration data stored locally at the access control device, the first set of configuration data, when applied, causing the device to function in a first mode of operation; whilst functioning in the first mode of operation, processing data indicative of access requests on the basis of the first set of configuration data; receiving data indicative of a command to change to a second mode of operation; in response to the command, ceasing application of the first set of configuration data and commencing application of a second set of configuration data, wherein the second set of configuration data is also stored locally at the access control device, the second set of configuration data, when applied, causing the device to function in the second mode of operation; and whilst functioning in the second mode of operation, processing data indicative of access requests on the basis of the second set of configuration data.

One embodiment provides access control system including: a plurality of access control devices as described herein; and a central server in communication with the plurality of access control devices via a network, wherein the central server is configured to provide to the plurality of devices data indicative of a command to change modes of operation, wherein in response to the command, the devices each cease applying a current set of configuration data and commence applying a different set of configuration data identified by the command.

One embodiment provides a method for controlling an access control environment, wherein the access control environment includes a plurality of access control devices as described herein, the method including providing to the devices data indicative of a command to change modes of operation, wherein in response to the command the software instructions cause the device to cease applying a current set of configuration data and commence applying a different set of configuration data identified by the command, wherein the different set of configuration data is locally stored at the devices.

One embodiment provides a hardware component configured device configured to perform a method as described herein.

One embodiment provides a computer program product configured device configured to perform a method as described herein.

One embodiment provides a carrier medium carrying computer executable code that, when executed on one or more processors, cause the performance of a method as described herein.

Reference throughout this specification to "one embodiment" or "an embodiment" or "some embodiments" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

BRIEF DESCRIPTION OF THE DRAWINGS

Embodiments of the invention will now be described, by way of example only, with reference to the accompanying drawings in which.

DETAILED DESCRIPTION

Described herein are systems and methods for managing access control devices. In overview, an access control device is configured to function on the basis of an applied set of configuration data. For example, the manner in which the device processes an access request is dependent on the configuration data. A device according to an embodiment of the present invention is configured to locally maintain a plurality of uniquely applicable sets of configuration data. Each set, when applied, causes the device to function in accordance with a respective mode of operation. The device is configured to change which set of configuration data is applied in response to a predetermined command, thereby allowing the device to shift between modes of operation relatively quickly and without the need to download additional configuration data. In some cases, the modes of operation correspond to threat levels, and the use of such access control devices allows a change in threat level to be applied across an access control environment quickly and with minimal bandwidth requirements.

Although examples considered herein are focused on access control devices, in other embodiments implementation occurs in respect of other devices, such as other devices in a broader security system (e.g. control systems configured for intrusion detection and/or video surveillance).

Access Control Environment

Figure 1:
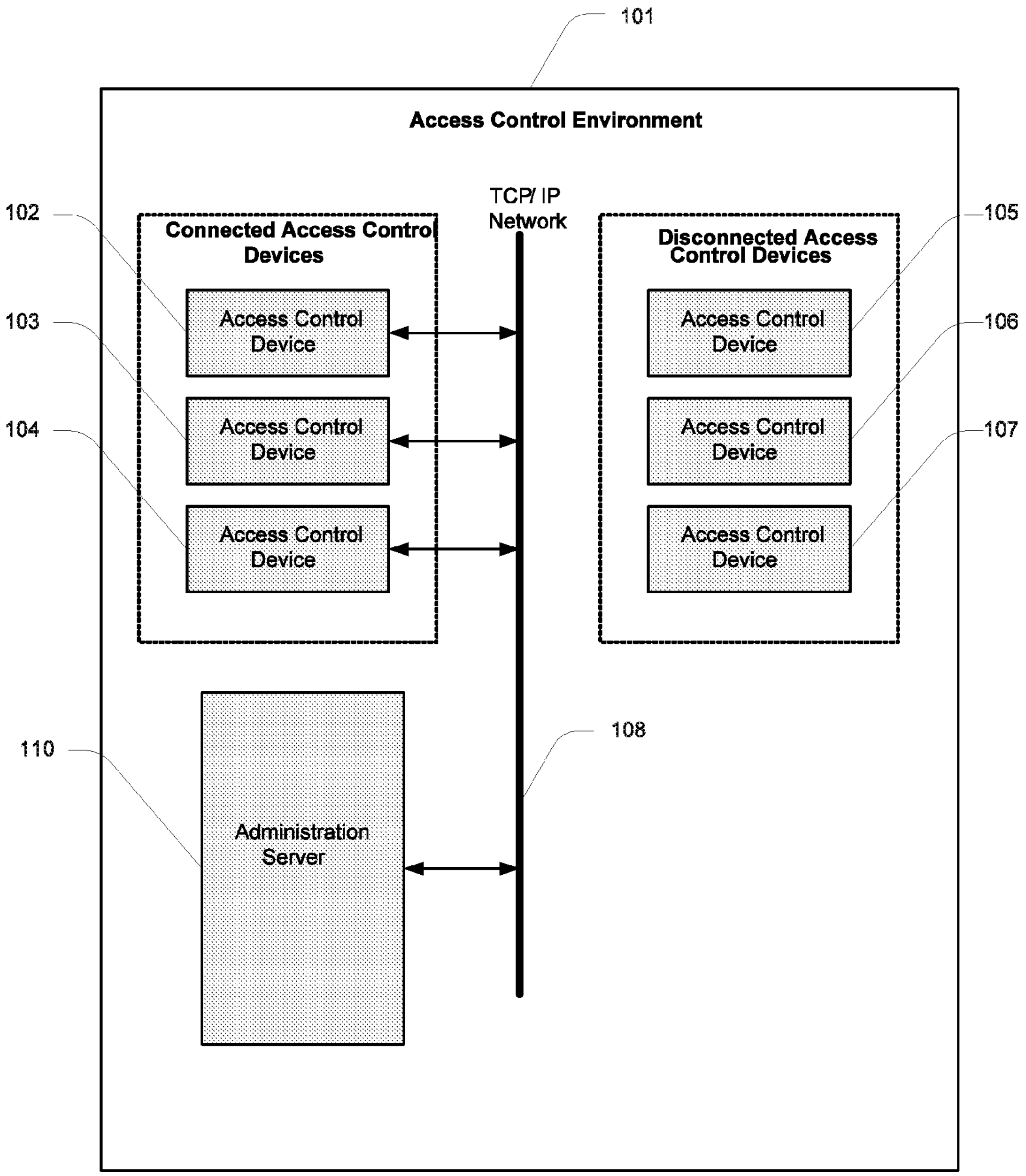
FIG. 1 schematically illustrates an access control environment according to one embodiment.

FIG. 1 schematically illustrates an access control environment 101 according to one embodiment. Environment 101 includes connected access control devices 102 to 104 and disconnected access control devices 105 to 107. The primary point of difference between the connected access control devices and the disconnected access control devices is that the former are connected to a network 108 (such as a TCP/IP or other network), whilst the latter are not. All of the access control devices have been commissioned for operation within environment 101, and provided configuration data to allow such operation.

An administration server 110 is also connected to network 108, and the connected access control devices are able to communicate with this administration server over the network. In this manner, server 110 is able to communicate with connected devices 105 to 107.

Although server 110 is schematically illustrated as a single component, in some cases it is defined by a plurality of distributed networked components.

For the sake of the present disclosure, it is assumed that each of access control devices 102 to 107 include similar hardware and software components, and each that device is configured to progress between a connected state and a disconnected state depending on whether or not a connection to network 108 and central server is available. However, in other embodiments a variety of different access control devices are used. For example, in some embodiments the access control devices are designed, from a hardware perspective, to allow/deny control to a variety of different locations or functionalities.

In the context of the present disclosure, the term "access control device" refers generally to any device having an access control functionality. That is, any device with which a user interacts to gain access to a physical region or virtual functionality. Common examples include devices that control locking mechanisms on doors or other barriers. An access control device includes either or both of hardware and software components.

Access Control Device

Figure 2:
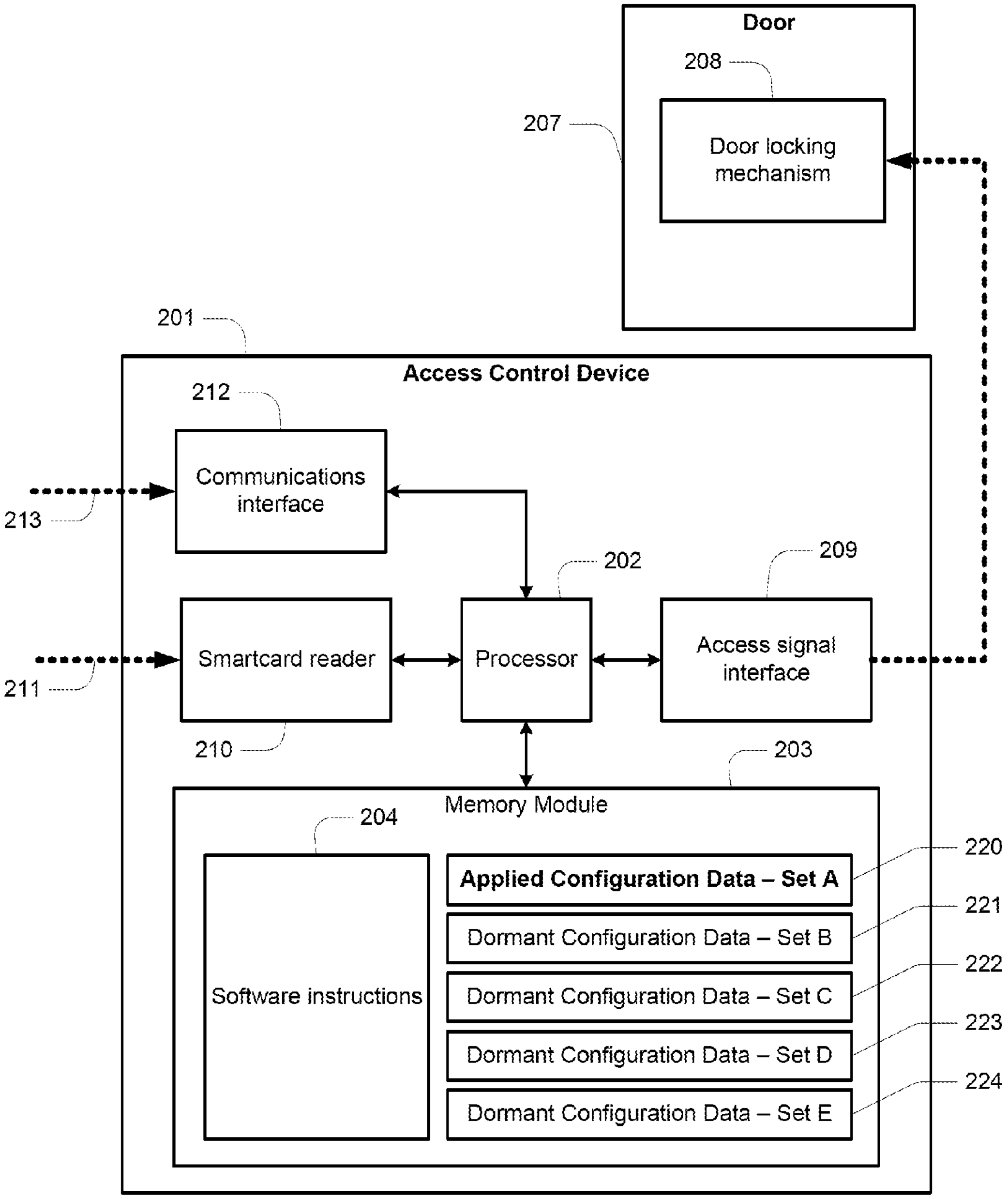
FIG. 2 schematically illustrates an access control device according to one embodiment.

FIG. 2 illustrates an exemplary access control device 201 according to one embodiment. Device 201 is configured for integration into an access control environment such as environment 101 of FIG. 1. Device 201 includes a processor 202 coupled to a memory module 203. Memory module 203 carries software instructions 204 which, when executed on processor 202, allow device 201 to perform various methods and functionalities described herein, which in themselves also provide embodiments of the present invention.

In the present example, device 201 is configured for selectively granting access through a door 207 having a locking mechanism 208. When in a locked state, this mechanism prevents access through the door, and when in an unlocked state, permits access through the door. To this end, processor 201 is coupled to an access signal interface 209 which selectively provides to locking mechanism 208 signals for unlocking and/or unlocking the door (in some cases the door retunes to a default locked state automatically, without need for an explicit "lock" signal). Whether or not the locked state is default depends on the configuration data applied at a particular point in time, although for the present example it is considered that the locked state is default, and unlocking of the door requires allowance of an access request.

A user wishing to gain access through door 207 makes an access request via device 201. For the sake of this example, this access request is initiated when the user presents (indicated by arrow 211) an access card to a card reader 210, which is also coupled to processor 201. Upon presentation of the access card, processor 202 performs an authentication/authorization process, influenced by configuration data, to determine whether or not access should be granted (i.e. the access request allowed). In the event that the authentication/authorization process is successful, interface 209 provides to mechanism 208 a signal thereby to progress mechanism 208 to the unlocked state for a predefined period of time, typically the order of a few seconds, before returning to the locked state. If the authentication process is unsuccessful, mechanism 208 remains in the locked state, and access is denied.

The nature of card reader 210 varies between embodiments depending on the nature of access card that is used in a given access control environment. In the embodiment of FIG. 2, access cards are in the form of smartcards, and reader 210 is a smartcard reader. However, in other embodiments alternate components are provided for the same purpose, including the likes of magnetic card readers, proximity readers, biometric readers, keypads, and so on. In some cases multiple readers are present, such as a smartcard reader in combination with a biometric reader (for instance an iris scanner).

Device 201 additionally includes a communications interface 212, such as a wired or wireless Ethernet networking interface, or the like. This allows device 201 to communicate with remote components, such as a central server (at least when the device operates in a connected state). In this regard, device 201 is configured to receive a control signal 213 from a central server, or other networked component.

Configuration Data

An access control device operates on the basis of configuration data. That is, the manner in which the device operates is dependent on the configuration data applied at a given point in time. For example, software instructions 204 include software instructions for processing data indicative of access requests, and this processing is performed on the basis of an applied set of configuration data. A given access request might be allowed based on one applied set of configuration data, but denied were another set of configuration data to be applied. This configuration data also influences other functionalities of the access control device.

Typically, an access control device maintains only a single set of configuration data. In known situations, such configuration data is downloaded during an initial configuration of a device, and updated configuration data is downloaded to the device over time as required. However, in accordance with the present embodiments, multiple sets of configuration data are downloaded to a device, with one being applied and the others remaining dormant in memory. This allows for a change in device configuration without a need to download new configuration data; the applied set is simply interchanged for one of the dormant sets.

A set of configuration data includes a plurality of aspects of data, optionally including one or more of the aspects of data outlined below:

- Settings directly relevant to the processing of access requests, such as authentication/authorization settings and/or other access permission settings. Specific examples include visitor access card rules (for example some sets of configuration data block authorization for visitor access cards), supervisor requirements (for example some sets of configuration data require a supervisor present before access is granted), minimum occupancy requirements (for example requiring a minimum number of authorized persons to enter/exit/remain with a zone at any given point in time).
- Hardware settings, such as whether a locked/unlocked state is default.
- Scheduling settings. These include, for example, scheduling matters, such as where a device adopts a certain default locked/unlocked state during one time period, and another default locked/unlocked state during a different time period. Scheduling settings may also affect settings directly relevant to the processing of access requests, for example by causing these to be varied over time.
- Special functions. For example, configuration data in some cases causes a device to provide a signal to a surveillance system when predefined criteria are met.

In the case of device 201, memory module 203 stores configuration data including a plurality of uniquely applicable sets of configuration data. In this sense, the term "plurality" refers to "two or more". That is, there may be two sets of configuration data, or more than two sets of configuration data.

In the context of FIG. 2, there are several sets of configuration data: configuration data set 220 and configuration data sets 221 to 224. For the sake of the example, set 220 is identified as the "active" configuration data (that which is applied) and sets 221 to 224 as "dormant" (that which is not applied).

Sets of configuration data are "uniquely applicable" in the sense that only one set is able to be applied at any given time, with other stored sets remaining dormant in memory. Although FIG. 2 illustrates only a small number of sets of dormant configuration data, there may be other sets of dormant configuration data stored in memory module 203 or elsewhere in device 201.

Each set of configuration data, when applied, causes the device to function in accordance with a respective mode of operation. In terms of the language presently used, the configuration data includes an $n^{th}$ set of configuration data that, when applied, causes the device to function in an $n^{th}$ mode of operation. For example:

- A first set of configuration data that, when applied, causes the device to function in a first mode of operation.
- A second set of configuration data that, when applied causes the device to function in a second mode of operation.

Communications interface 212 is configured for receiving data indicative of a command to change modes of operation. In response to such a command, software instructions 104 cause device 201 to cease applying a current set of configuration data and commence applying a different set of configuration data identified by the command. For example, when the device is functioning in a first mode of operation, the communications interface is configured for receiving data indicative of a command to change to a second mode of operation, and in response to the command the software instructions cause the device to cease applying the first set of configuration data and commence applying the second set of configuration data. In the context of FIG. 2, such a command causes a specified one of sets 221 to 224 to become active, and set 220 to become dormant in memory.

The nature of "data indicative of a command to change modes of operation" varies between embodiments. In some cases this data references a mode of operation to be adopted, in other cases it references a set of configuration data to be applied, and in other cases it refers to a threat level (or other criteria) to be applied. The data is in some embodiments transmitted over the network to connected access control devices as a TCP/IP signal or the like.

Application to Threat Levels

Embodiments are described below by reference to a situation where each set of configuration data corresponds to a respective "threat level". The term "threat level" is used to describe a high-level security assessment. For example, the US Department of Homeland Security implements a "threat level" system via their Homeland Security Advisory System. This system uses the following criteria:

- Severe (red): severe risk.
- High (orange): high risk.
- Elevated (yellow): significant risk.
- Guarded (blue): general risk.
- Low (green): low risk.

In general terms, the Homeland Security Advisory System is a color-coded terrorism threat advisory scale. The different levels trigger specific actions by federal agencies and state and local governments, and they affect the level of security at some airports and other public facilities. In this regard, there is often a link between the System and the manner in which access control environments should be implemented. For example, an escalation in threat levels might have a practical consequence in that greater access control scrutiny is applied in, say, regions of an airport. For example, a particular class of employee may be able to access a particular area under one threat level, but not under another.

Different threat level systems are used in other jurisdictions and/or for other purposes, including UK Threat Levels, and Vigipirate in France. The present disclosure should not be limited to any such system in isolation, and the use of the term "threat level" is descriptive only, relating to the general concept of a tiered system whereby security or other concerns are categorized at a high-level and in an objective manner.

In the present embodiments, a set of configuration data is defined for each threat level, and the resulting sets of configuration data downloaded to the individual access control devices. At any given time, one set of configuration data is applied (preferably corresponding to the current threat level) and the other sets remain dormant in memory.

In general terms, an access control device according to the present embodiment stores in memory:

A first set of configuration data, when applied, causes the software instructions process data indicative of access requests in accordance with a first threat level.

An $n^{th}$ set of configuration data, when applied, causes the software instructions process data indicative of access requests in accordance with an $n^{th}$ threat level.

Figure 3A:
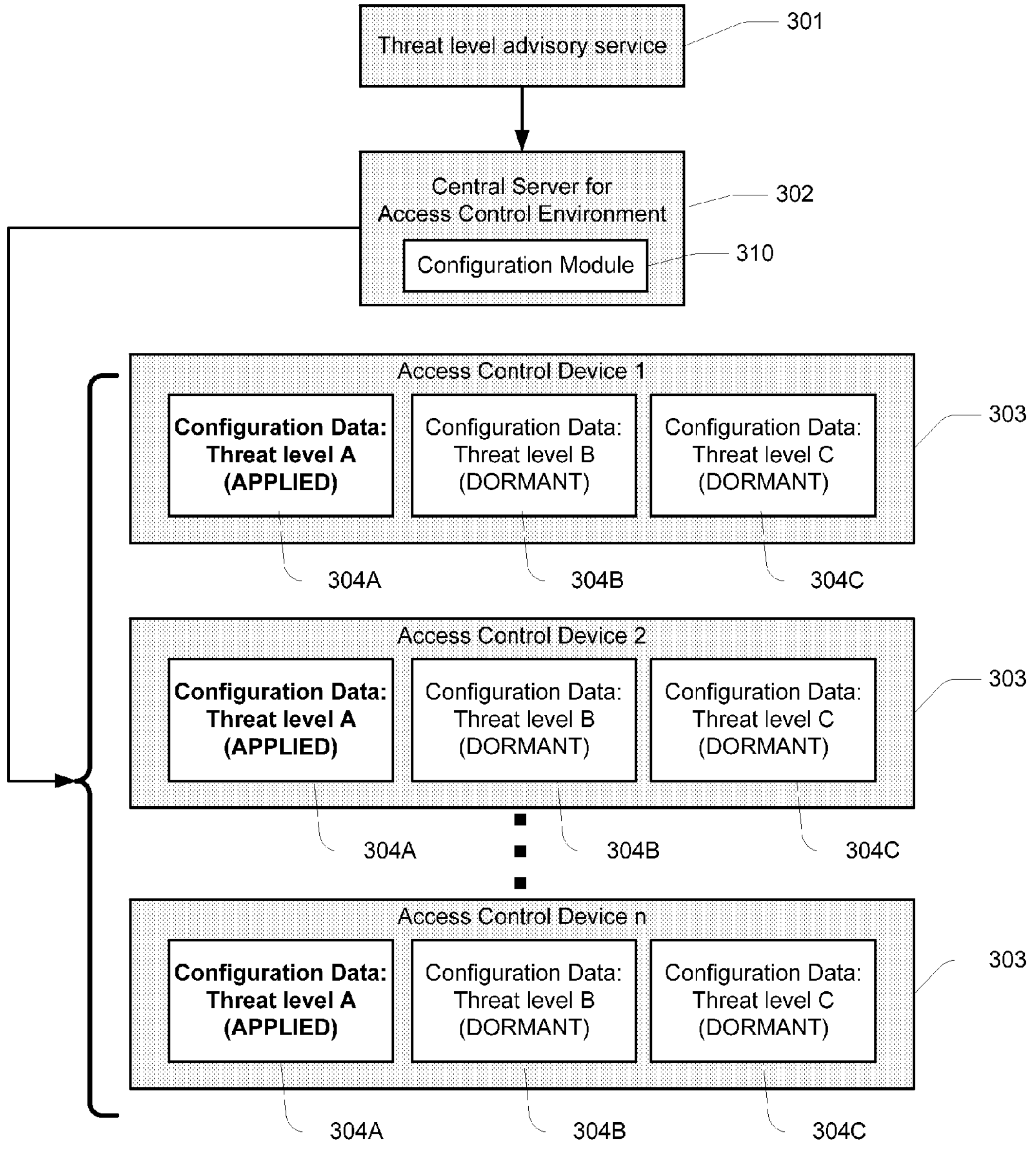
FIG. 3A schematically illustrates an access control environment according to one embodiment.
Figure 3B:
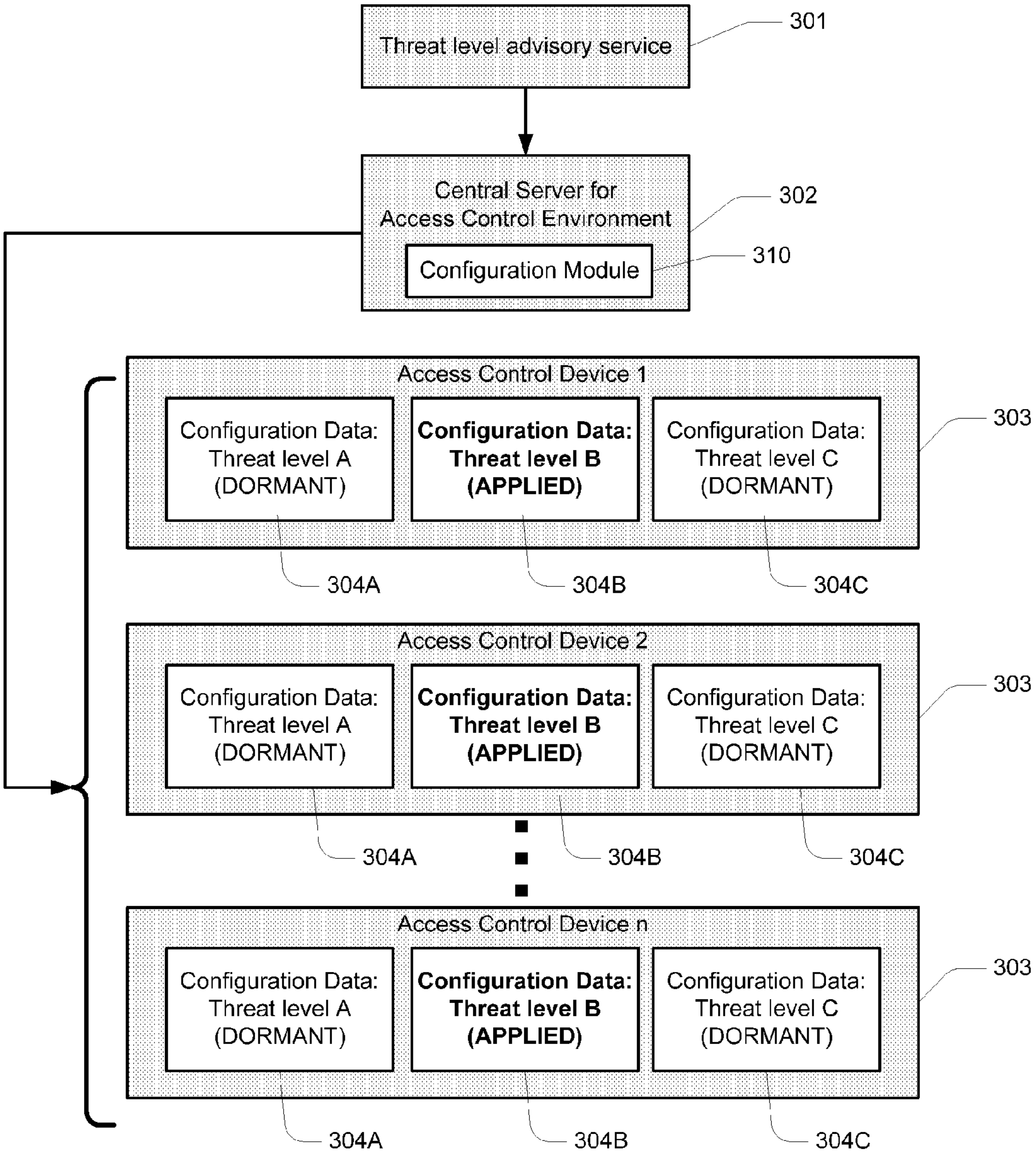
FIG. 3B schematically illustrates an access control environment according to one embodiment.

Such an embodiment is schematically illustrated in FIG. 3A and FIG. 3B. A threat level advisory service 301 provides data indicative of a threat level, or change in a threat level. This data is provided to the central server 302 of an access control system. In some embodiments the data is provided by an automated electronic process (for example an automated notification), whist in other cases the data is initially provided electronically via a notification (for example through a news agency, email, or the like), and subsequently manually entered into the central server.

When the central server receives data indicative of a change in threat level, it provides a signal to all connected access control devices 303 with which it compatibly interacts. In the illustrated example, there are "n" access control devices 303, and each maintains configuration data for at least three threat levels, being set 304A for "threat level A", set 304B for "threat level B", and set 304C for "threat level C".

In the context of FIG. 3A, set 304A (corresponding to threat level A) is applied. For the sake of a simple example, it is assumed that threat level advisory service 301 provides to server 302 data indicative of a change to threat level B. As such, server 302 provides to each of devices 303 an instruction to apply set 304B, and those devices apply that set as shown in FIG. 3B.

It is not necessary that configuration data sets be identical among devices. For example, data set 304A might differ between devices, for example where those devices behave differently for a given threat level. For example, one device might control access to an area that is restricted to certain personnel during a given threat level, whilst another device might control access to an area that is restricted to other certain personnel during that same threat level. This is optionally managed via system wide configuration, as described below.

System Wide Configuration

From an implementation perspective, one embodiment provides a threat level configuration module 310, being a software-based component allowing a user to define configuration data corresponding to threat levels. This module is, as illustrated, operable on central server 302. However, in another embodiment it is operable on a machine in communication with server 302. In some embodiments the module executes on a processor of server 302, although a user interface is presented on a remote terminal via a browser-based implementation or the like.

For the sake of the present examples, it is considered that module 310 provides a user interface for allowing a user to select between a plurality of threat levels, and adjust various parameters for each of those threat levels. For example, a user is able to select a GUI object corresponding to a particular threat level, and via that object access various menus and options for allowing modification of parameters for that threat level. The threat levels are optionally provided with default parameters.

In overview, module 310 allows a user to set up configuration data for a plurality of threat levels on a system-wide level. That is, rather than manually defining individual sets of configuration data for each individual access control device, module 310 provides an interface for defining the meaning of threat levels on a system wide basis, and from that automatically defines the actual sets of configuration data for the individual devices.

Figure 4:
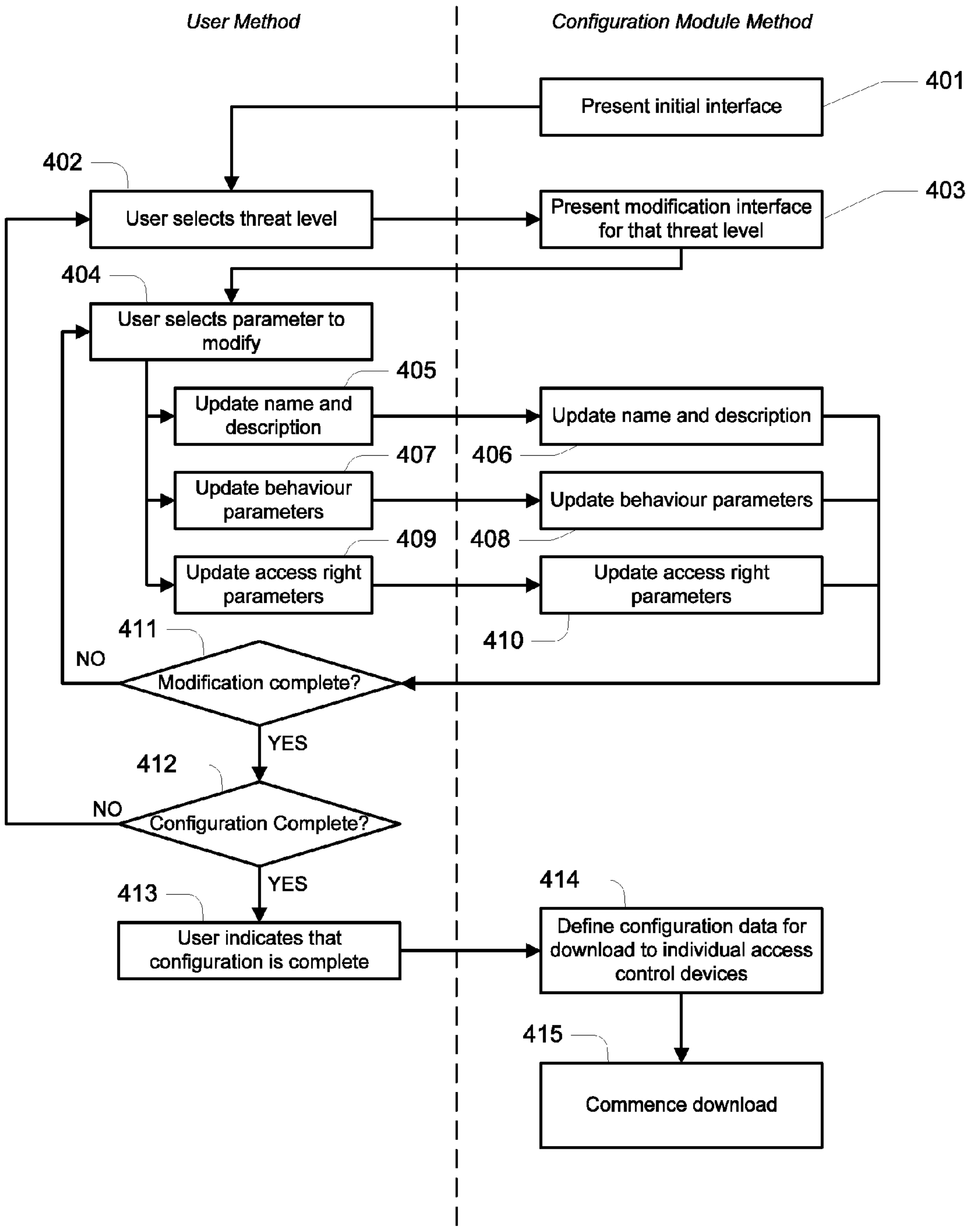
FIG. 4 illustrates a method according to one embodiment.

FIG. 4 illustrates a method for configuring threat levels in an access control environment according to one embodiment. This method is described in terms of a configuration module method, which is indicative of processes performed by the configuration module, and a user method, which is indicative of actions undertaken by a human user.

At step 401 the configuration module presents an initial user interface, which allows a user to select between one of a plurality of threat levels. These may be predefined, or available for user creation. A user selects a threat level at step 402, and the configuration module presents a modification interface for that threat level at step 403. For example, the modification interface provides various prompts, menus and/or and fields for allowing the user to modify various parameters for a threat level. The presently considered parameters are:

Name and description. For example, these could optionally correspond to names and descriptions for an existing threat level system, such as the Homeland Security Advisory System.

Behavior parameters. These define how a given access control device should behave under a given threat level. For example, this may include settings such as allow/block visitor cards, supervision requirements, minimum occupancy requirements, default door states (locked/unlocked), authentication needs, authorization settings, camera recording settings, and so on.

Access right parameters. These define which cardholders/categories of cardholders have access to a given door (i.e. can traverse a given access control device) for the relevant threat level.

The user decides which parameter to modify at step 404, and optionally modifies name and description at 405 (leading to a name/description update at 406), behavior parameters at 407 (leading to a behavior parameter update at 408), or access right parameters at 409 (leading to a access right parameter update at 410). Whichever of these is selected, the method progresses to decision 411, where the user decides whether or not to modify other parameters, based on which the method either loops to step 404, or progresses to decision 412. At decision 412, the user decides whether configuration is complete, and either selects another threat level at 402, or provides and indication (explicit or implicit) that configuration is complete.

Following step 413, the configuration module defines configuration data for download to the individual control devices at step 414. This is downloaded to the devices at step 415, using one of the various known methodologies for downloading configuration data to access control devices. For example, this may include network transfer, download to portable media for provision to disconnected devices, and so on.

Once the configuration data is downloaded, the devices initially adopt a specified default threat level. It will be appreciated that a simple command is all that is required to progress the devices to a different threat level.

Applying Threat Level Changes to Disconnected Devices

As noted above, an access control environment often includes disconnected devices, being access control devices that are not connected to the central server via a network. The above disclosure deals with a situation where threat level changes are communicated via a command provided via the network. It will be appreciated that other approaches are required to communicate such a command to disconnected devices. Some exemplary approaches for achieving that goal are discussed below.

A relatively rudimentary approach is to simply manually deliver the command to disconnected devices, for example by presenting a smartcard or other carrier substrate (e.g. USB device) to the individual devices, or by connecting a portable computational platform (e.g. notebook computer, PDA, smartphone or the like) and uploading the command directly.

A more advanced (and less resource intensive) approach is to use ordinary user interactions to propagate a command. In the context of the present example, smartcards are used for the purpose of providing access requests. In overview, timestamped threat level information is maintained on smartcards, and devices are configured to read from each smartcard timestamped data indicative of a threat level. Subject to a predetermined authentication/authorization procedure (and other predefined constraints) the device selectively either:

- Adopts the set of configuration data for that threat level. This only occurs where the read data has a more recent timestamp as compared with the threat level being applied by the device. In some cases there are additional constraints for security purposes, one of which might be to prevent reduction in threat level by various classes of user.
- Writes to the smartcard updated timestamped data indicative of a threat level. This occurs where the device has newer threat level information than the smartcard. In this manner, connected devices begin updating smartcards as soon as a threat level change command is received from a central server and processed.
- Takes no action.

It will be appreciated that such an approach is particularly effective for propagating threat level changes throughout an access control environment having disconnected devices, in a relatively unobtrusive and resource conscious manner.

In some cases threat levels cause devices to make additional modifications to smartcards. For example, various categories of user may have their cards cancelled, so that they can not be used in future.

Conclusions and Interpretation

It will be appreciated that the above disclosure provides various systems and methods for managing access control devices, these methods and systems providing distinct advantages and technical contributions over what was previously known in the art. For example, the storage of multiple sets of configuration data locally at individual devices allows substantial modification to device configuration/operation to be effected quickly and efficiently by way of a simple command signal. This is especially significant in respect of disconnected readers, noting that the simple nature of the command signal allows it to be effected by data carried by a conventional access card (in spite of inherent information storage constraints of such access cards) for convenient delivery to disconnected access control devices.

Unless specifically stated otherwise, as apparent from the following discussions, it is appreciated that throughout the specification discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., an liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagrams only show a single processor and a single memory that carries the computer-readable code, those in the art will understand that many of the components described above are included, but not explicitly shown or described in order not to obscure the inventive aspect. For example, while only a single machine is illustrated, the term "machine" or "device" shall also be taken to include any collection of machines that individually or jointly execute a set (or multiple sets) of instructions to perform any one or more of the methodologies discussed herein.

At least one embodiment of various methods described herein is in the form of a computer-readable carrier medium carrying a set of instructions, e.g., a computer program that are for execution on one or more processors, e.g., one or more processors that are part of building management system. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the a processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an exemplary embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method, a carrier wave bearing a propagated signal detectable by at least one processor of the one or more processors and representing the set of instructions a propagated signal and representing the set of instructions, and a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/ features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The invention claimed is:

1. An access control device including:

a processor for allowing the execution of software instructions, including software instructions for processing data indicative of access requests on the basis of an applied set of configuration data and selectively allowing or denying the respective requests;

a memory module coupled to the processor, the memory module storing data indicative of the software instructions and configuration data, wherein the configuration data stored by the device includes a plurality of uniquely applicable sets of configuration data, wherein each set, when applied, causes the device to function in accordance with a respective mode of operation;

a communications interface that is configured for receiving data indicative of a command to change modes of operation, wherein in response to the command the software instructions cause the device to cease applying a current one of the sets of configuration data and commence applying a different one of the sets of configuration data identified by the command; and an input that is configured to, when operating in a disconnected state:

interact with an access control token, wherein the access control token maintains time stamped data indicative of a mode of operation associated with a specific one of the uniquely applicable sets of configuration data;

in the case that predefined requirements are met, adopt the mode of operation associated with the specific one of the uniquely applicable sets of configuration data; and in the case that the predefined requirements are not met, continue to function in accordance with a current mode of operation associated with a current one of the uniquely applicable sets of configuration data, and write to the access control token updated time stamped data indicative of the current mode of operation associated with the current one of the uniquely applicable sets of configuration data.

2. The access control device access according to claim 1 wherein the plurality of sets of configuration data include:

a first set of configuration data that, when applied, causes the device to function in a first mode of operation; and a second set of configuration data that, when applied causes the device to function in a second mode of operation;

such that when the device is functioning in the first mode of operation, the communications interface is configured for receiving data indicative of a command to change to the second mode of operation, and in response to the command the software instructions cause the device to cease applying the first set of configuration data and commence applying the second set of configuration data.

3. The access control device access according to claim 1 wherein the configuration data includes an $n^{th}$ set of configuration data that, when applied, causes the device to function in an $n^{th}$ mode of operation.

4. The access control device access according to claim 1 wherein each set of configuration data corresponds to a respective threat level.

5. The access control device according to claim 4 wherein:

a first set of configuration data, when applied, causes the software instructions process data indicative of access requests in accordance with a first threat level; and a second set of configuration data, when applied, causes the software instructions process data indicative of access requests in accordance with a second threat level.

6. The access control device access according to claim 1 wherein each set of configuration data describes respective authentication/authorisation settings.

7. The access control device access according to claim 1 wherein each set of configuration data describes respective access permission settings.

8. The access control device access according to claim 1 wherein each set of configuration data describes settings in relation to one or more of the following:

visitor access card rules;

supervisor requirements;

minimum occupancy requirements;

default access control states;

other access related rules and surveillance settings.

9. A method performable by an access control device, the method including:

applying a first set of configuration data stored locally at the access control device, the first set of configuration data, when applied, causing the device to function in a first mode of operation;

whilst functioning in the first mode of operation, processing data indicative of access requests on the basis of the first set of configuration data;

receiving data indicative of a command to change to a second mode of operation;

in response to the command, ceasing application of the first set of configuration data and commencing application of a second set of configuration data, wherein the second set of configuration data is also stored locally at the access control device, the second set of configuration data, when applied, causing the device to function in the second mode of operation;

whilst functioning in the second mode of operation, processing data indicative of access requests on the basis of the second set of configuration data;

whilst functioning in a disconnected state, reading an access control token, wherein the access control token maintains time stamped data indicative of a mode of operation associated with a specific one of the uniquely applicable sets of configuration data;

in the case that predefined requirements are met, adopt the mode of operation associated with the specific one of the uniquely applicable sets of configuration data; and in the case that the predefined requirements are not met, continue to function in accordance with a current mode of operation associated with a current one of the uniquely applicable sets of configuration data, and write to the access control token updated time stamped data indicative of the current mode of operation associated with the current one of the uniquely applicable sets of configuration data.

10. The method according to claim 9 wherein the device additionally stores an nth set of configuration data that, when applied, causes the device to function in an $n^{th}$ mode of operation.

11. The method according to claim 9 wherein each set of configuration data corresponds to a respective threat level.

12. The method according to claim 11 wherein:

when the first set of configuration data is applied, processing data indicative of access requests is performed in accordance with a first threat level; and when the second set of configuration data is applied, processing data indicative of access requests is performed in accordance with the second threat level.

13. The method according to claim 9 wherein each set of configuration data describes respective authentication/authorisation settings.

14. The method according to claim 9 wherein each set of configuration data describes respective access permission settings.

15. The method according to claim 9 wherein each set of configuration data describes settings in relation to one or more of the following:

visitor access card rules;

supervisor requirements;

minimum occupancy requirements;

default access control states;

other access related rules; and surveillance settings.

16. The method according to claim 9 wherein the method is performable on the basis of software instructions stored on a memory module of the access control device by execution of those instructions on a processor of the access control device.

17. An access control system including:

a plurality of access control devices according to claim 1; and a central server in communication with the plurality of access control devices via a network, wherein the central server is configured to provide to the plurality of devices data indicative of a command to change modes of operation, wherein in response to the command, the devices each cease applying a current set of configuration data and commence applying a different set of configuration data identified by the command.

18. A method for controlling an access control environment, wherein the access control environment includes a plurality of access control devices according to claim 1, the method including providing to the devices data indicative of a command to change modes of operation, wherein in response to the command the software instructions cause the device to cease applying a current set of configuration data and commence applying a different set of configuration data identified by the command, wherein the different set of configuration data is locally stored at the devices.

* * * * *